United States Patent [19]

Begouen

[11] Patent Number: 4,773,898
[45] Date of Patent: Sep. 27, 1988

[54] DEVICES FOR ORALLY ADMINISTERING TREATMENT LIQUIDS TO ANIMALS

[76] Inventor: Jean-Paul Begouen, Lambost-Archignat 03380, Huriel, France

[21] Appl. No.: 457,242

[22] Filed: Jan. 11, 1983

[51] Int. Cl.$^4$ .............................................. A61J 7/00
[52] U.S. Cl. ..................................................... 604/79
[58] Field of Search ...................... 604/54, 73, 77, 181, 604/212, 283, 403, 408, 905

[56] References Cited

U.S. PATENT DOCUMENTS

| | | | |
|---|---|---|---|
| 2,948,279 | 8/1960 | Mann | 604/212 |
| 3,669,101 | 6/1972 | Kleiner | 604/77 |
| 3,938,898 | 2/1976 | Reitknecht | 604/212 |
| 4,050,460 | 9/1977 | Magrath | 604/212 |
| 4,335,770 | 6/1982 | Kulle et al. | 604/408 |

FOREIGN PATENT DOCUMENTS

| | | | |
|---|---|---|---|
| 00061130 | 12/1863 | France | 604/181 |
| 1030639 | 11/1953 | France | 604/212 |
| 2387030 | 12/1978 | France | 604/77 |
| 2434613 | 3/1980 | France | 604/77 |
| 2487633 | 2/1982 | France | 604/77 |

Primary Examiner—C. Fred Rosenbaum
Assistant Examiner—Michele Lester
Attorney, Agent, or Firm—Michael Ebert

[57] ABSTRACT

A device for administering to animals a treatment liquid stored in a container, the device comprising a hollow loop serving as a flow conduit between the container and a flexible nozzle mounted on one side of the loop adapted to direct a jet of the liquid toward the back of the animal's throat. The loop has a geometry close to that of an equilateral triangle, the corners of which adjacent the side which carries the nozzle being rounded whereby the loop may be clamped very firmly on the nose of the animal without inflicting pain.

6 Claims, 4 Drawing Sheets

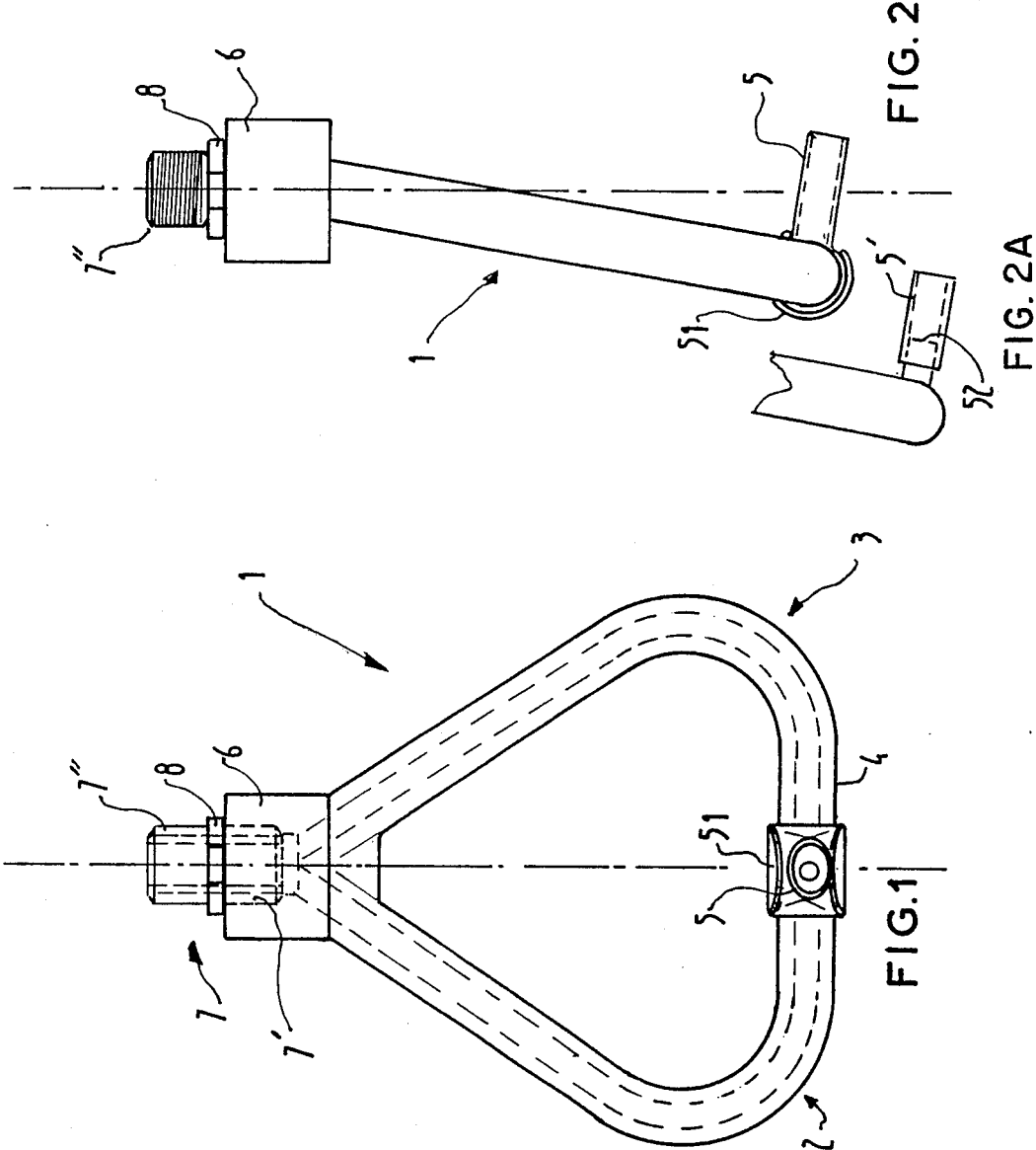

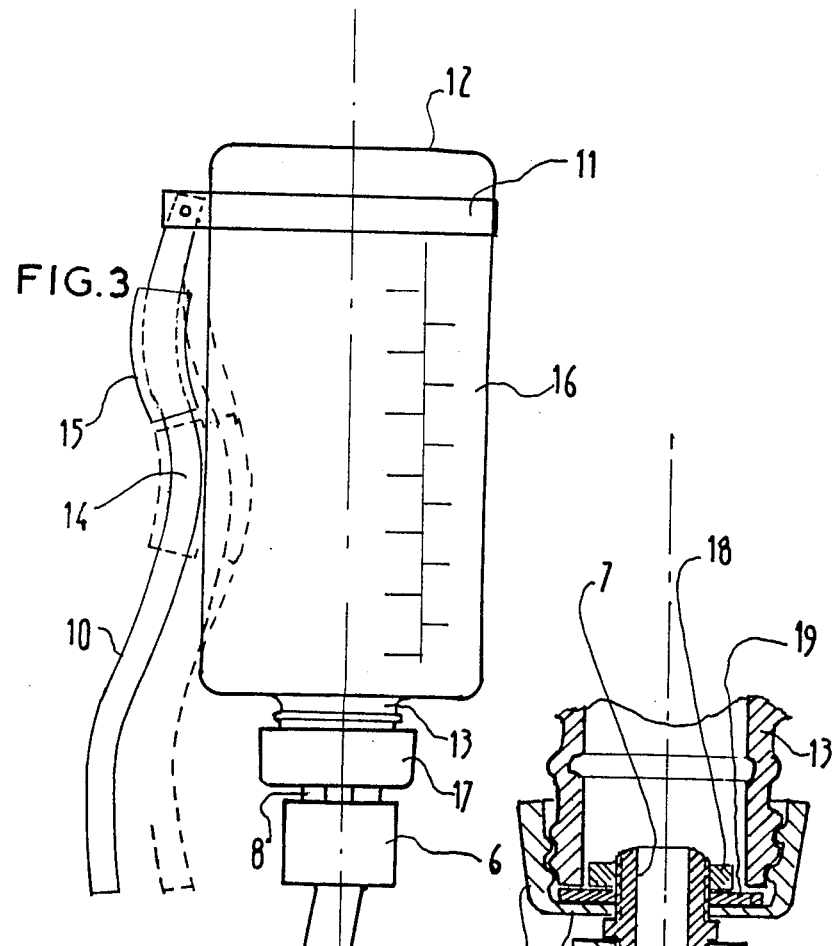
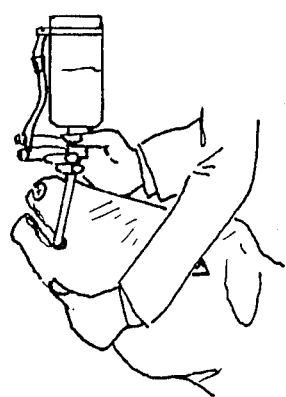
FIG.3
FIG.4
FIG.5

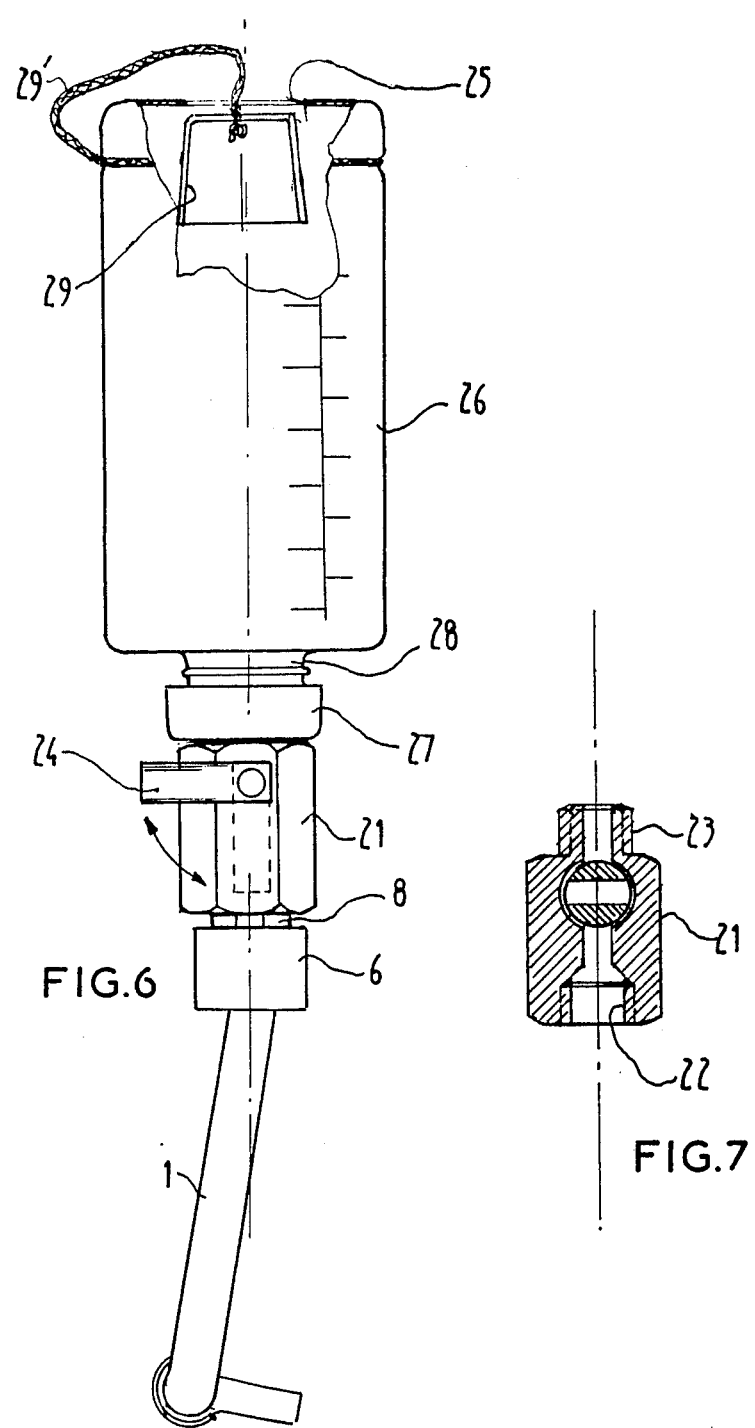

DEVICES FOR ORALLY ADMINISTERING TREATMENT LIQUIDS TO ANIMALS

BACKGROUND OF INVENTION

Field of Invention

This invention relates generally to the breeding of animals, and more particularly to a device for orally administering to animals liquid medicaments and other treatment solutions.

The prior art discloses various devices for orally administering fluids to animals. Thus the 1938 German Pat. No. 662,740 to Massler; the 1911 German Pat. No. 246,041 to Lappat and the 1923 German Pat. No. 372,798 to Keller show devices of this type which take the form of a bit to which a funnel is attached to feed liquid into the animal by gravity flow. In the 1977 U.S. Pat. No. 4,050,460 to Magrath and in the 1980 French Pat. No. 2,434,613 to Begouen, liquid is forced into the animal by a device which employs manual pressure for the purpose.

Of greatest prior art interest is the device disclosed in the pending French application No. 80/17143 of Begouen in which the liquid to be administered is contained in a flexible bulb coupled to a flow conduit formed by a hollow trapezoidal loop functioning as a bit which is inserted in the mouth of the animal.

SUMMARY OF INVENTION

In view of the foregoing, the main object of this invention is to improve the device disclosed in the above-identified French application by providing a flow loop more compatible with the morphology of the animals to be treated so as to permit the loop to be better positioned in the animal's mouth.

More specifically, an object of this invention is to provide a flow loop that can be firmly clamped onto an animal's nose without inflicting pain.

Also an object of the invention is to provide an improved flow loop of the above type which is adapted to promote liquid flow in different situations.

Briefly stated, a device in accordance with the invention for administering a treatment liquid to an animal comprises a hollow loop which is configured to encompass the upper jaw and nose of the animal and which functions as a conduit for the treatment liquid. The hollow loop which is coupled to liquid supply is provided with a flexible nozzle for directing a jet of liquid in a direction leading towards the bottom of the animal's throat, the liquid from the supply flowing through the loop to the nozzle. The loop has a generally triangular shape approaching that of an equilateral triangle, the corners of the loop adjacent the side of the triangle which carries the nozzle being rounded and of relatively large radius.

The configuration of the loop is such that it can be firmly clamped onto the nose of the animal, by a pull which causes the loop to engage the bottom of the animal's mouth, this action taking place without causing the animal to suffer, particularly at the corners of its lips.

In a preferred embodiment, the loop is made of plastic material and is constituted by a single triangular piece. The loop includes a cylindrical boss at the vertex thereof opposite the side carrying the nozzle, the boss having a threaded bore adapted to receive a coupling provided at opposite ends with two threaded male nipples, which coupling has a hexagonal grip surface at its central portion. This boss affords a strong base for screwing on the coupling.

In practice, the coupling with two threaded male nipples may be attached in three different ways. Thus it is attachable to the cap of a bottle (first variant), it can be screwed into a cock member which in turn is attached to a bottle cap (second variant), or it can be connected to a flexible liquid supply tube (third variant).

OUTLINE OF THE DRAWINGS

For a better understanding of the invention as well as other objects and further features thereof, reference is made to the following detailed description to be read in conjunction with the accompanying drawings, wherein:

FIG. 1 is a front view of a loop in accordance with the invention for use in a treatment liquid administering device;

FIG. 2 is a side view of the loop;

FIG. 2a shows an alternative form of nozzle for the loop;

FIG. 3 is a side view of a first embodiment of this device, in which the loop is coupled to a bottle;

FIG. 4 is a section taken through an enlarged portion of FIG. 3 showing how the loop is attached to the cap of the bottle (first variant);

FIG. 5 illustrates the manner of applying the device shown in FIG. 3 to the nose of an animal;

FIG. 6 is a partially cut away side view of a second embodiment of the device.

FIG. 7 is a sectional view of a cock member (second variant); and

DESCRIPTION OF INVENTION

Figure 8:
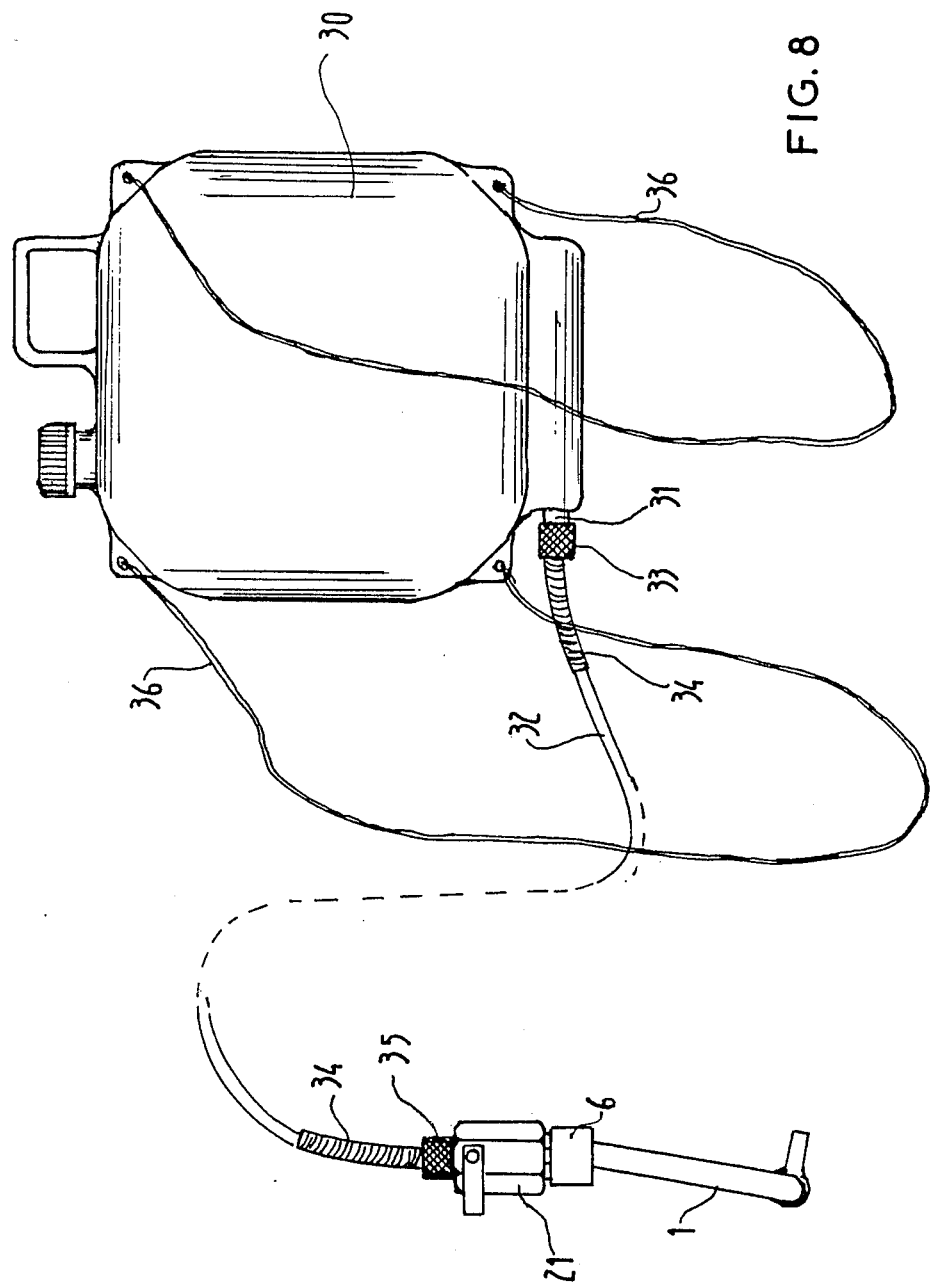
FIG. 8 illustrates a third embodiment of the device in which the loop is coupled to a tube (third variant).

Referring now to FIGS. 1 and 2, there is shown a hollow loop, generally designated by numeral 1, for feeding a treatment liquid to an animal. The loop has the general shape of an equilateral triangle, one of whose side 4 acts as a bit having a nozzle 5 secured at its midpoint. The corners 2 and 3 of side 4 are rounded and of a rather large radius, so that they do not cut into the lips of the animal.

Loop 1 is fabricated of a single piece, preferably of synthetic plastic material. It is provided at its vertex which is opposite side 4 to which nozzle 5 is attached, with a cylindrical boss 6. Boss 6 has an internally-threaded axial bore adapted to receive the externally-threaded male nipple 7' at one end of a cylindrical coupling 7 whose opposite end is provided with a male nipple 7". The central portion 8 of coupling 7 intermediate the nipples has a hexagonal grip surface. Hollow loop 1 forms a continuous conduit extending between the entry of threaded nipple 7" and the exit of flexible nozzle 5.

Two embodiments of the flexible nozzle and its attachments are provided. In the first embodiment shown in FIGS. 1 and 2, the nozzle is made of a small rubber tube having at one end two diametrically-opposed cutouts to surround side 4 of the loop and to be fastened thereto by adhesive bonding. The attachment is reinforced by a collar 51. In the second embodiment of the nozzle, shown in FIG. 2a, a rigid, relatively short nozzle 52 is attached to side 4 of loop 1, and a flexible nozzle 5' is glued to short nozzle 52.

FIG. 3 shows a manual-pressure administration device in accordance with the invention composed primarily of loop 1 secured via a cap 17 to the neck 13 of an inverted bottle 16 having deformable walls. Clamped into the upper end 12 of bottle 16 is a collar 11 having a lever 10 hinged thereon. Lever 10 is provided with an inwardly curved portion 14 which engages the wall of bottle 14. Hence when a manual force is applied to the lever, curve portion 14 applies pressure to the wall and as shown in dotted lines it acts to deform the wall and thereby squeeze liquid out of the bottle.

Lever 10 has a total length, which extends substantially up to boss 6 of the loop and is advantageously provided with a sleeve 15 which is of flexible material. This sleeve can therefore be shifted along lever 10 to a position surrounding curved portion 14 to thereby effectively enlarge the thickness displaced by the application of manual force to the sleeve is increased and in fact may be doubled to provide a much greater discharge of liquid from the bottom.

FIG. 4 illustrates in greater detail the manner in which loop 1 is fastened to neck 13 of bottle 16 by cap 17 screwed onto the neck. Cap 17 has an axial bore in its bottom wall 20 to receive threaded nipple 7". A nut 18 is screwed onto nipple 7" and rests via washer 19 against the inner face of bottom wall 20 to form a sealed joint.

It is to be noted that washer 19 extends well beyond nut 18 over practically the entire inner face of bottom wall 20 so that the end of neck 13 can sit tightly against it. Also to be noted is that nut 18 lies within neck 13. Thus a strong and leak-proof coupling is provided by this arrangement between the bottle and the loop, yet the loop may be readily decoupled from the bottle when it is necessary to replenish the liquid.

One manner of using the device is illustrated in FIG. 5 where it will be seen that an operator is grasping the head of an animal below its jaws with his left hand. At the same time, the operator's right hand is holding the device at position between the bottle and the loop with his thumb engaging one side and his ring finger and little finger engaging the other side, while his index finger and middle finger rest on the operating lever.

Since the nose of the animal widens from its end toward its forehead whereas the sides of loop 1 converge toward the boss 6 at the vertex, a pull exerted by the right hand of the operator in a direction toward the forehead of the animal will necessarily bring side 4 of the loop against the upper jaw of the animal, this side acting as a bit. This useful result is due to the unique geometry of the loop and makes it convenient to apply the device to an animal regardless of the particular variant in actual use.

FIG. 6 shows a second embodiment of a liquid and administering device which employs gravity flow rather than manual pressure to eject the liquid. In this instance, the device, includes a loop 1 similar to that of FIGS. 1 and 2, a cock 21 and a bottle 26 coupled by its cap 27 to cock 21.

Bottle 26 is provided at its end opposite to the neck 28 thereof with a circular orifice 25, this orifice being exposed in FIG. 6 by the broken-away showing. A stopper 29 having a conical form serves to plug orifice 25, the stopper being connected by a cord 29' to the outer wall of the bottle. Cock 21 which is a well known commercially-available device, is a spherical "turning" cock which can be operated by means of a handle 24, the body of the cock having a hexagonal cross-sectional form.

As shown in FIG. 7, the body of cock 21 has a threaded bore 22 thereon and a threaded nipple 23 projecting therefrom. Nipple 23 is identical to nipple 7" of the loop coupling 7, while threaded bore 22 corresponds in its diameter and pitch to nipple 7"; hence nipple 7" can be screwed into bore 22.

Thus when cock 21 is screwed onto coupling 6, loop 1 is then coupled to bottle 26 through cock 21 in a manner comparable to that shown in FIGS. 3 and 4. In this gravity flow arrangement, the rate of flow is controlled by adjustment of cock 21; and when the bottle is empty, it may be replenished by removing the stopper and refilling the bottle.

In FIG. 8, loop 1, in accordance with the third variant, is connected to a can 30 whose base is provided with a threaded nipple 31. A flexible pipe 32 is provided at one end with a threaded female coupling 33 which is screwed onto can nipple 31. The pipe is provided at its other end with a female coupling 35 which is screwed onto the threaded nipple 23 of the cock 21 (see FIG. 7). Pipe 32 is provided at either end by sheathings 34 in the form of coil springs which are linked to the female couplings, these springs preventing abrupt bends in the pipe in the vicinity of the couplings. Can 30 is provided with shoulder straps 36 making it possible to carry the can in the back.

The three variants disclosed are intended for different applications, all of them having the loop and its coupling in common. The first variant (FIG. 3) which uses a pressure-operated squeeze bottle is useful when small and rather precise amounts of liquids must be administered to an animal. The second variant (FIG. 6) which involves gravity flow is useful in the event a small number of doses of small volume are to be administered and where an exact dosage is relatively unimportant. The third variant (FIG. 8), which is also gravity flow, can be used in cases similar to the second variant, except that the number of doses to be administered may be much greater.

Devices in accordance with the inventions are useful for feeding large animals of all sorts, from the size of large dogs, up to the size of cattle and horses.

While there have been shown and described preferred embodiments of devices for orally administering treatment liquids to animals, in accordance with the invention, it will be appreciated that many changes and modifications may be made therein without, however, departing from the essential spirit thereof.

I claim:

1. A device for administering to animals a treatment liquid, said device comprising:
  A. a container to store the treatment liquid;
  B. a hollow loop formed of a single piece of tubing and having a geometry close to that of an equilateral triangle whose two inclined sides coverge toward a vertex;
  C. a nozzle mounted on the third side of the loop at a positon opposite to the vertex thereof and adapted to direct a jet of the liquid toward the back of the animal's throat, the corners of the loop adjacent said third side being rounded with a relatively large radius sufficient to avoid cutting the lips of the animal to define a bit having a pear-shaped space in the area bounded by the sides which is compatible with the morphology of the animal being treated, whereby the loop can be clamped very firmly on the nose of the animal without inflicting pain; and D. means coupling the vertex of the loop to the container, said loop serving as a conduit to conduct the liquid from the container to the nozzle, said means being constituted by a cylindrical boss at the vertex, which boss has a threaded bore adapted to receive one eternally-threaded male nipple of a coupling having a second externally-threaded male nipple which is coupled to the container.

2. A device as set forth in claim 1, in which the container is a bottle having a flexible wall, the bottle having a cap screwed onto its neck, which cap is coupled to the second male nipple, and a lever clamped to the bottle, the lever having an inwardly curved portion which engages the wall, and which when the lever is operated, deforms the wall to squeeze liquid from the bottle.

3. A device as set forth in claim 2, wherein the lever is provided with a sleeve of flexible material which is shiftable along the lever to cover the curved portion thereof and thereby increase its thickness to enchance the deformation of the wall.

4. A device according to claim 2, wherein said cap is provided with an axial hole to receive the second threaded nipple, a nut being screwed on the second nipple and resting, via a washer forming a sealing joint, against the inner face of the bottom of the cap.

5. A device according to claim 1, further including a cock interposed between the container and the loop, said cock having at one of its ends a threaded female bore adapted to receive the second threaded nipple of said coupling, and at its other end a threaded nipple.

6. A device according to claim 5, wherein said container is a can of large volume provided with a threaded nipple, and said loop is connected to the said can by a flexible pipe, one of whose ends is provided with a first female coupling screwed onto the nipple of the can, the other end of the pipe being provided with a second flexible second female coupling screwed onto the threaded nipple of the cock.

* * * * *